(12) United States Patent
Stair (10) Patent No.: US 11,408,522 B1
(45) Date of Patent: Aug. 9, 2022

(54) CHECK VALVE

(71) Applicant: Todd Stair, Houston, TX (US)

(72) Inventor: Todd Stair, Houston, TX (US)

( * ) Notice: Subject to any disclaimer, the term of this patent is extended or adjusted under 35 U.S.C. 154(b) by 0 days.

(21) Appl. No.: 16/583,655

(22) Filed: Sep. 26, 2019

Related U.S. Application Data (60) Provisional application No. 62/738,114, filed on Sep. 28, 2018.

(51) Int. Cl.
*F16K 15/02* (2006.01)

(52) U.S. Cl.
CPC .................. *F16K 15/026* (2013.01)

(58) Field of Classification Search
CPC .............................. F16K 15/026; F16K 15/063
See application file for complete search history.

(56) References Cited

U.S. PATENT DOCUMENTS

| | | | | |
|---|---|---|---|---|
| 735,549 A * | 8/1903 | Menking | ............... | F16K 15/063 137/541 |
| 1,260,663 A * | 3/1918 | Gould et al. | .......... | F16K 15/063 137/541 |
| 2,602,631 A * | 7/1952 | Eickmeyer | ............ | F16K 15/063 137/515.5 |
| 3,125,117 A * | 3/1964 | Borgard | ................ | F16K 15/063 137/493.4 |
| 4,148,338 A * | 4/1979 | Skoli | ...................... | F16K 15/063 137/454.2 |
| 4,633,853 A * | 1/1987 | Prill | ...................... | F16K 15/063 122/14.31 |
| 4,765,364 A * | 8/1988 | Arcari | ................... | F16K 15/063 137/515.5 |
| 2017/0254173 A1* | 9/2017 | Downey | ................. | E21B 33/14 |

\* cited by examiner

*Primary Examiner* — Reinaldo Sanchez-Medina
*Assistant Examiner* — Nicole Gardner
(74) *Attorney, Agent, or Firm* — Leavitt Eldredge Law Firm (57) ABSTRACT

An erosion resistant check valve includes a valve housing having a fluid flow passage extending therethrough; a valve seat extending within the fluid flow passage; a valve member slidingly engaged within the fluid flow passage; a spring engaged with the valve stem to contract upon pressure towards the stop; a housing positioned over the first end of the valve stem and past the stop, the housing creating a gap between a portion of the stem body and an inner surface of the housing; the spring contracts into the housing and the disk is seals the spring within the housing to prevent fluid contact therewith.

6 Claims, 7 Drawing Sheets

CHECK VALVE

BACKGROUND

1. Field of the Invention

The present invention relates generally to check valve systems, and more specifically, to an erosion resistant check valve with a housing configured to protect a spring within the valve, thereby protecting the spring from erosion.

2. Description of Related Art

Figure 1:
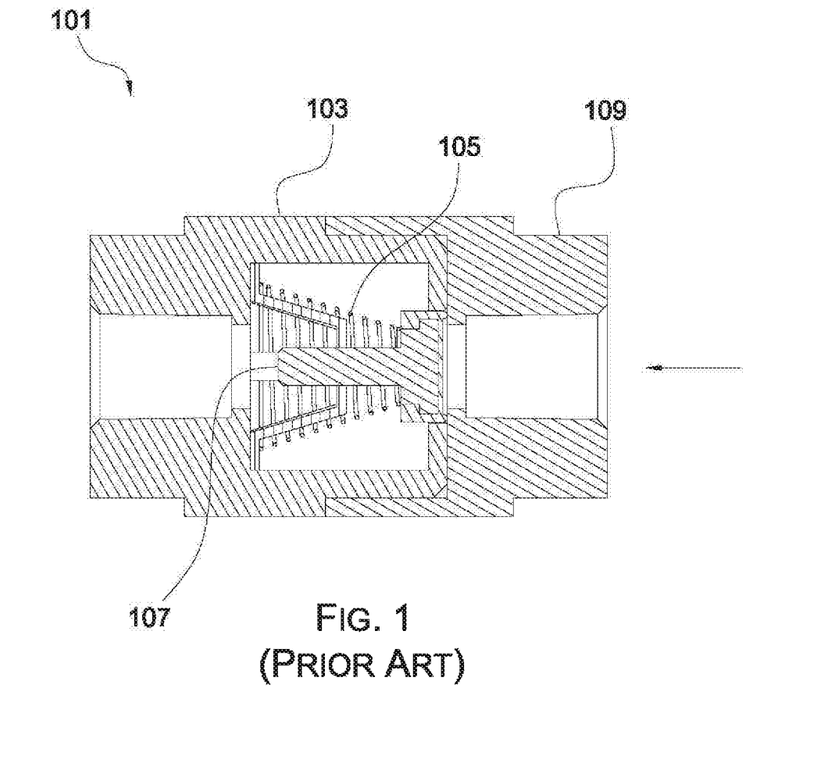
FIG. 1 is a side cross sectional view of a common check valve system.

Check valve systems are well known in the art and are effective means to permit fluid flow or pressure to act in one direction. Check valves having various features are common and used within a variety of industries, including, among others, the oil and gas industry. For example, FIG. 1 depicts a conventional check valve system 101 having a body 103 forming a fluid flow channel, and a fluid inlet 109 in communication with a valve 107. A spring 105 allows for the valve to open and close, thereby allowing for fluid to flow around the valve and spring.

One of the problems commonly associated with conventional check valves is erosion. Erosion is commonly caused by high flow rate and/or high density and/or abrasive fluids flowing around elements within a fluid passage of the valve. One commonly eroded element is the spring within the valve. Such erosion can cause severe damage, thereby preventing proper functioning of the valve.

Accordingly, there lies a need for a means to protect the spring within the valve from erosion caused by fluid flow.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional check valve systems. Specifically, the present invention provides a housing configured to surround the spring, particularly when the valve is fully opened, thereby protecting the spring from erosion. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
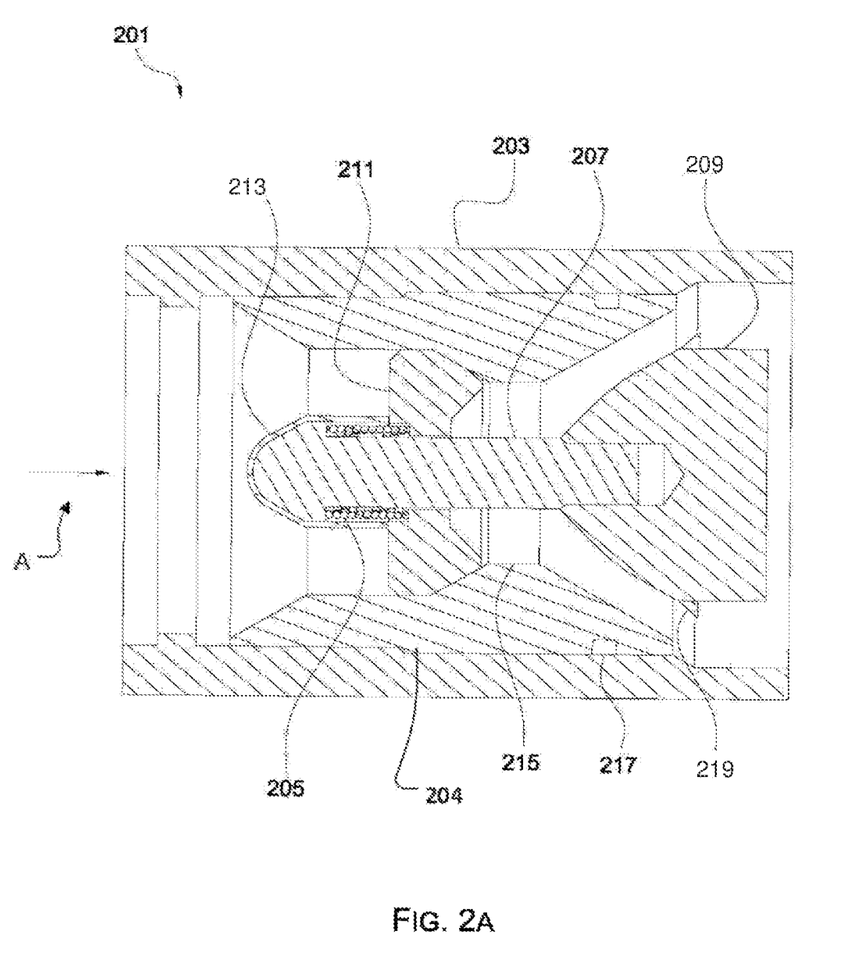
FIGS. 2A and 2B are side cross-sectional views of an erosion resistant check valve system in accordance with a preferred embodiment of the present application.
Figure 2B:
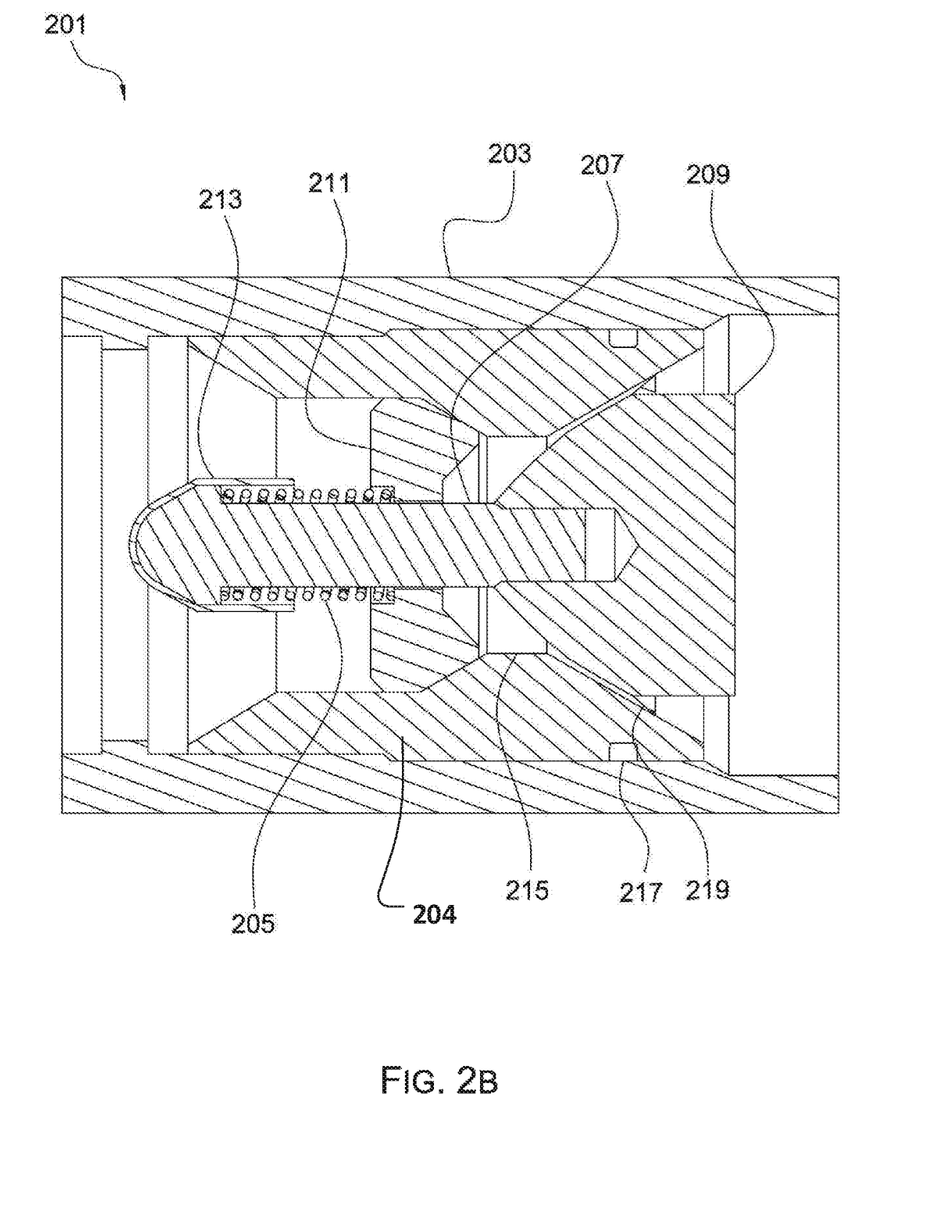
Figure 3:
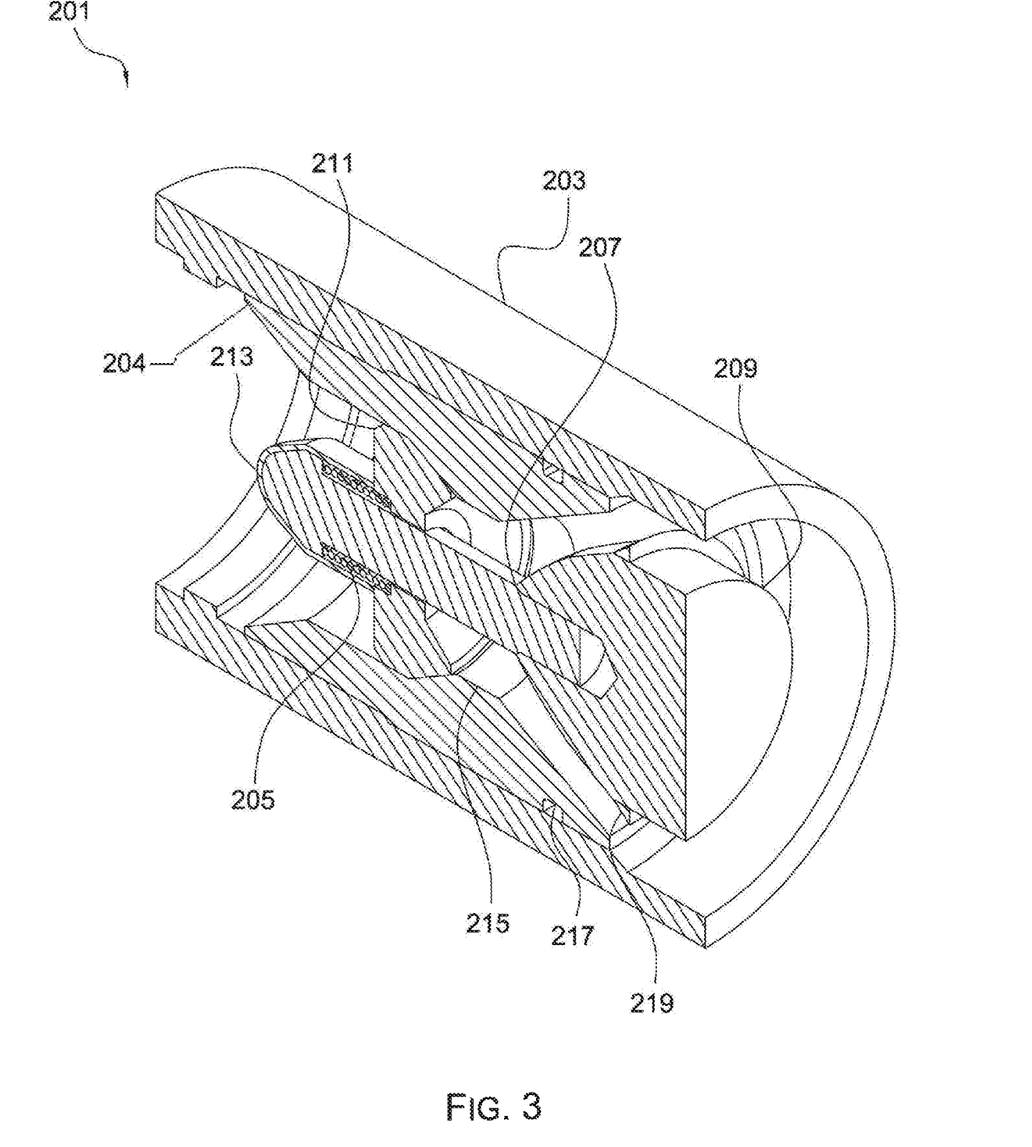
FIG. 3 is an oblique crosps-sectional view of the erosion resistant check valve system of FIGS. 2A and 2B.

Referring now to the drawings wherein like reference characters identify corresponding or similar elements throughout the several views, FIGS. 2A, 2B, and 3 depict various views of an erosion resistant check valve system 201 in accordance with a preferred embodiment of the present application. It will be appreciated that system 201 overcomes one or more of the above-listed problems commonly associated with conventional check valve systems.

In the contemplated embodiment, system 201 includes a valve housing 203 having a fluid flow passage extending therethrough from a fluid inlet (indicated with arrow A) to a fluid outlet. The fluid flow passage is further defined via a body 204 positioned within the housing and defining the shape of the flow passage and further defining a valve seat 215. It should be appreciated that the size, dimensions, materials, style, and the like of the erosion control check valve can vary based on the industry and use of the check valve. The check valve of the present invention can further be scaled up or down to fit the needs of the user, and is not limited to one particular industry.

System 201 further includes a valve 209 having a stem 207 extending therefrom, and slidingly engaged within the flow passage. Again, the exact dimensions, size, and shape of the valve can vary. The stem 207 is surrounded at least partially by a spring 205, the spring being configured to contract upon pressure, thereby opening the valve from seat 215 and allowing flow therethrough.

As shown in the preferred embodiment, a disk 211 is further positioned around a periphery of the stem 207, thereby providing a contact point for the spring, and a means to create contraction of the spring 205, opening and closing the valve.

System 201 further includes a housing 213 configured to secure over a first end of the stem 207 and configured to provide a gap between the housing and the stem (as will be further shown in FIGS. 4A and 4B), wherein the spring is contracted into when the valve is in a fully open position, as shown in FIG. 2A. As shown, the spring is completely removed/isolated from the fluid flow passage via the stem 207, the housing 213, and the disk 211, thereby protecting the spring from fluid flow and erosion.

It should be appreciated that one of the unique features believed characteristic of the present application is the use of housing 213 to provide protection to the spring. As previously discussed, it is common for the spring to erode, thereby becoming damaged and inoperable. Housing 213 provides an efficient and convenient means to protect the spring 205 from the erosion and prolong the life of the valve.

System 201 can include additional features, including a seal 219 extending around a periphery of the valve 209 and one or more anchoring means 217 configured to secure the inner body 204.

Figure 4A:
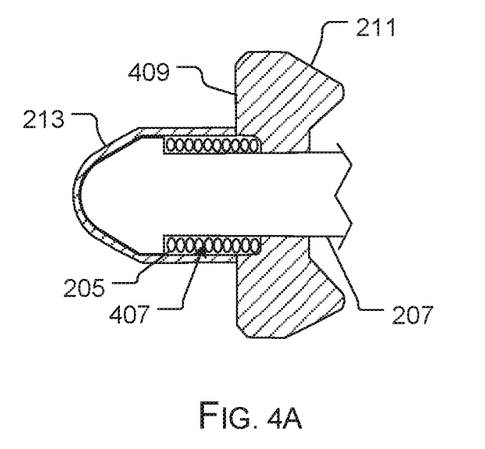
FIGS. 4A and 4B are a simplified side line drawing of the valve stem, spring, housing, and disk of FIGS. 2A and 2B.
Figure 4B:
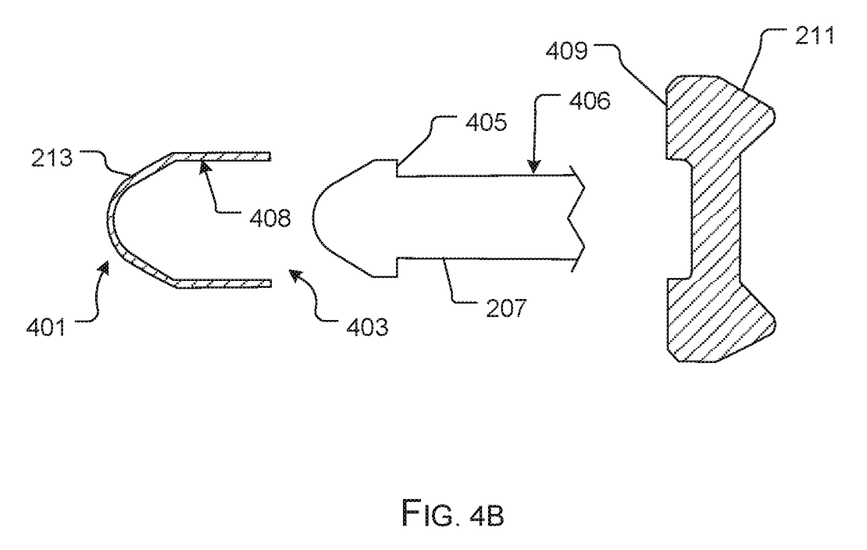

In FIGS. 4A and 4B, the configuration of the housing 213 is shown for further clarity. In the preferred embodiment, the housing 213 includes a first end 401 and a second end 403, wherein the first end 401 is closed off and tapers towards the second end 403, and second end 403 is open to receive the stem 207. As further shown, the stem 207 includes a stop 405 to secure the spring 205 at the desired location and create the gap 407 between outer surface 406 of stem 207 and inner surface 408 of housing 213, this gap being needed to receive and enclose the spring. Disk 211 can further include a protruding side 409 to aid in the sealing off of the spring, as is novel in the art.

Figure 5:
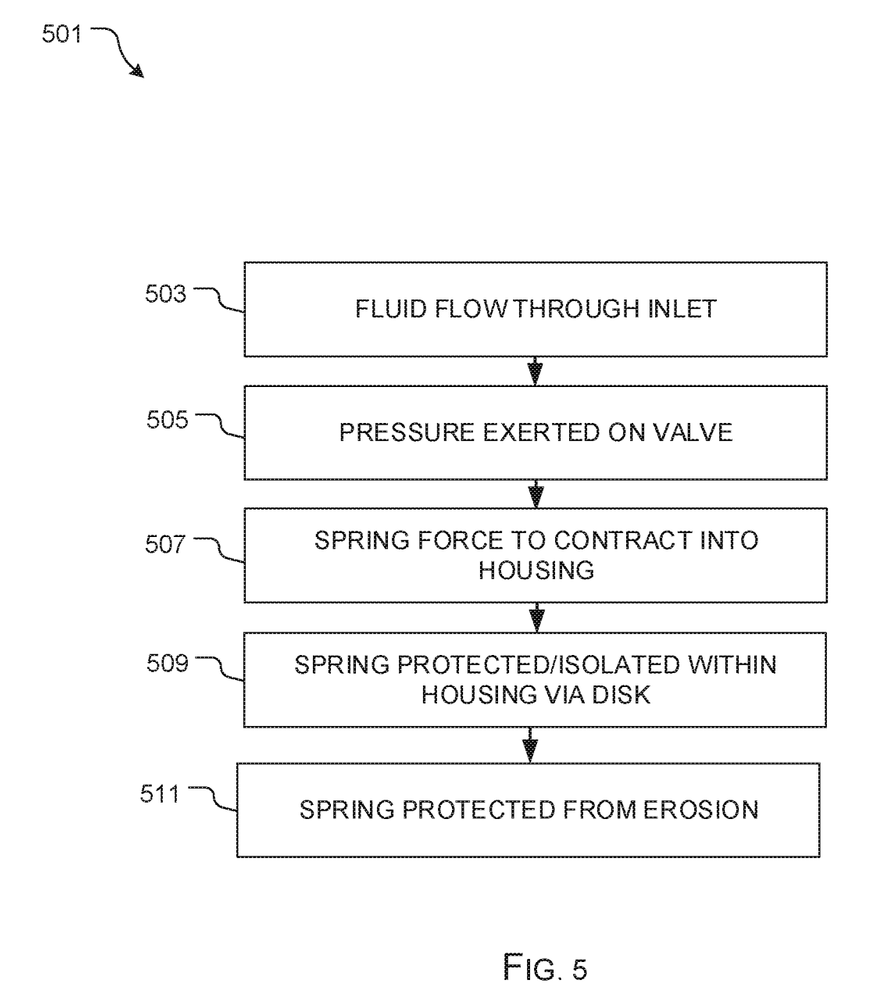
FIG. 5 is a flowchart of the method of the erosion resistant check valve of FIGS. 2A and 2B.

In FIG. 5, a flowchart 501 depicts the method of system 201. During use, fluid flows through the inlet, wherein pressure is exerted onto the valve and the spring contracts to open the valve, as shown with boxes 503, 505. As the spring is fully contracted, the spring slides into the housing and is sealed off by the disk, as shown with boxes 507, 509. The spring is thereby protected from erosion as is commonly caused by the fluid flow, as shown with box 511.

Another unique feature believed characteristic of the present application is the configuration of the disk 211. The disk 211 comprises a body that provides for both a lower spring retention surface (as shown in FIGS. 4A and 4B) without acting as a mechanical structure of the valve body. The disk is dropped into the valve body, allowing for single piece valve body construction, wherein the disk is not a structural member of the valve assembly. As opposed to conventional valve assemblies, the disk 411 of the present invention is retained in place by force as exerted by the spring, and engaging with a mating surface within the valve body. This configuration provides advantages over the prior art, such as reduced manufacturing costs and increasing reliability and performance.

Figure 6:
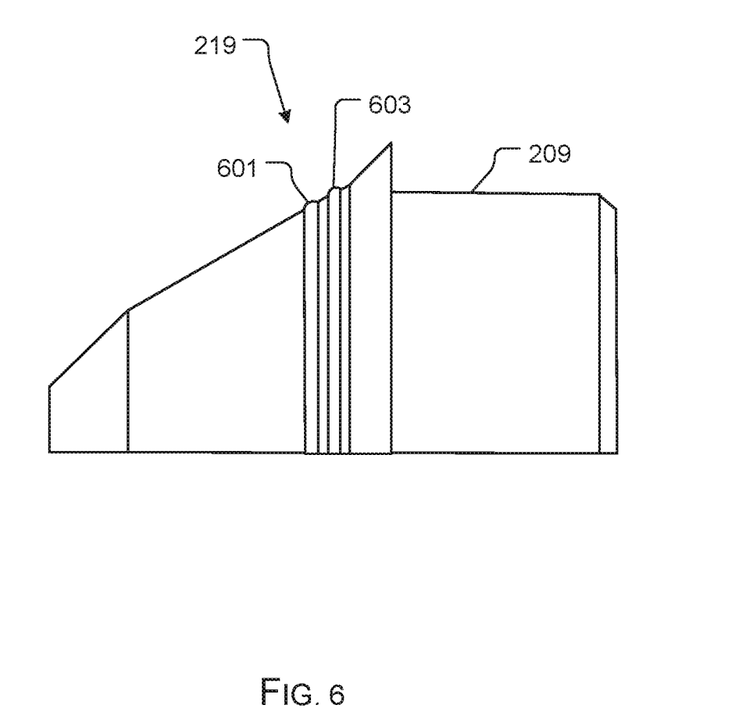
FIG. 6 is a close-up, partial side view of a seal of FIGS. 2A and 2B in accordance with a preferred embodiment of the present application.

Yet another unique feature believed characteristic of the present invention is seal 219. As better shown in FIG. 6, seal 219 is a unique elastomer lip seal that allows for the valve to withstand low and high pressure loads with gas media. It should be understood that most valves within the industry will be liquid tight, however, conventional seals do not hold pressure with smaller gas molecules. As shown, in the preferred embodiment, the seal includes two radiused beads 601, 603 molded into the seal. These radiused beads 601, 603 allow for high seal pressure to be exerted between the two metals with relatively low seal force. This feature allows for even relatively weak spring force to result in high seal pressure because of the small contact area between the beads 601, 603 and the metal surface.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A check valve, comprising:
  a valve housing having a fluid flow passage extending therethrough from a fluid inlet to a fluid outlet;
  a valve seat extending within the fluid flow passage;
  a valve member slidingly engaged within the fluid flow passage and configured to seal against the valve seat, the valve member having an elongated stem;
  the elongated stem having a first diameter and a second diameter, wherein a stop is created at an intersection of the first diameter and second diameter;
  a disc secured to the valve seat, the disc having an opening through which the elongated stem extends;
  a spring extending around a portion of a periphery of the elongated stem such that an end of the spring engages with the stop of the elongated stem of the valve member and the spring is configured to contract upon pressure against the disc and the stop; and
  a housing having a closed end and an open end, the housing positioned around an end of the elongated stem of the valve member, such that the end of the elongated stem is positioned adjacent to the closed end of the housing, the housing creating a gap around the elongated stem of the valve member at the second diameter;
  wherein the spring is positioned within the gap formed between the housing and the elongated stem;
  wherein, while the spring is in a contracted position, the housing forms a fluid seal between the disc and the elongated stem as a fluid travels around the housing so as to prevent the fluid from entering into the gap and coming into contact with the spring disposed therein;
  wherein the spring contracts into the housing to protect and isolate the spring within the housing to prevent fluid contact therewith; and
  wherein, while the spring is in a relaxed position, the housing covers only a portion of the spring.

2. The valve of claim 1, wherein the housing further comprises:
  a partially tapered side wall extending from the closed end to the open end.

3. The valve of claim 1, further comprising:
- an internal body forming the fluid flow passage.

4. The valve of claim 1, wherein the valve member includes the valve stem having a stop positioned at a first end; and a valve body configured to seal against the valve seat.

5. The valve of claim 4, further comprising:
- one or more seals extending around an outer surface of the valve body.

6. The valve of claim 1, wherein the disk further comprises:
- a circular body having an inner diameter and an outer diameter; and a protruding side wall configured to engage with the spring.

\* \* \* \* \*